(12) United States Patent
Hu et al.

(10) Patent No.: US 11,190,104 B2
(45) Date of Patent: Nov. 30, 2021

(54) DC/DC CONVERTER AND METHOD FOR CONTROLLING PHASE SHIFT ANGLE THEREOF

(71) Applicant: Delta Electronics (Shanghai) CO., LTD, Shanghai (CN)

(72) Inventors: Wenfei Hu, Shanghai (CN); Cheng Lu, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 28 days.

(21) Appl. No.: 16/739,769

(22) Filed: Jan. 10, 2020

(65) Prior Publication Data
US 2020/0228017 A1    Jul. 16, 2020

(30) Foreign Application Priority Data

Jan. 16, 2019    (CN) .......................... 201910040952.9

(51) Int. Cl.
*H02M 3/158*    (2006.01)
*H02M 3/07*    (2006.01)
*H02M 1/00*    (2006.01)

(52) U.S. Cl.
CPC .......... *H02M 3/1584* (2013.01); *H02M 3/07* (2013.01); *H02M 1/009* (2021.05); *H02M 3/1586* (2021.05)

(58) Field of Classification Search
CPC .......... H02M 1/08; H02M 1/36; H02M 1/083; H02M 1/15; H02M 3/22; H02M 3/24;
(Continued)

(56) References Cited

U.S. PATENT DOCUMENTS 6,349,044 B1 * 2/2002 Canales-Abarca .......................... H02M 3/33576
363/17
6,353,547 B1 * 3/2002 Jang ...................... H02M 7/487
363/132
(Continued)

FOREIGN PATENT DOCUMENTS

CN    101267160 A    9/2008
CN    102025162 A    4/2011
(Continued)

OTHER PUBLICATIONS

Lee Jun-Young et al: "Three level NPC dual active bridge capacitor voltage balancing switching modulation",2017 IEEE International Telecommunications Energy Conference (INTELEC), IEEE, Oct. 22, 2017 (Oct. 22, 2017), pp. 438-443.
(Continued)

*Primary Examiner* — Thienvu V Tran
*Assistant Examiner* — Nusrat Quddus
(74) *Attorney, Agent, or Firm* — Qinghong Xu

(57) ABSTRACT

A DC/DC converter includes a first capacitor and a second capacitor coupled to a first node, a first switch and a second switch coupled between the first node and a second node, a third switch and a fourth switch coupled between the first node and a third node, a first passive network coupled between a fourth node and a fifth node, the first passive network connecting the fourth node and the fifth node in series to a primary winding of a transformer, and a secondary side circuit coupled to a secondary winding of the transformer; a control method of the DC/DC converter includes: adjusting a phase shift angle between control signals of the first switch and the fourth switch to reduce a voltage difference between the first capacitor and the second capacitor.

18 Claims, 18 Drawing Sheets

(58) Field of Classification Search
CPC ........ H02M 3/325; H02M 3/335; H02M 3/28; H02M 3/33569; H02M 3/33507; H02M 3/33538; H02M 3/33546; H02M 3/33515; H02M 3/33576; H02M 3/33592; H02M 3/33553; H02M 3/33523; H02M 3/33584; H02M 7/487; H02M 2001/0058; H02M 2007/4815; H02M 2007/4818; Y02B 70/1491

See application file for complete search history.

(56) References Cited

U.S. PATENT DOCUMENTS

| | | | |
|---|---|---|---|
| 6,370,050 B1* | 4/2002 | Peng | H02M 3/33576 363/17 |
| 6,442,047 B1* | 8/2002 | Cohen | H02M 3/1588 363/17 |
| 7,638,904 B2* | 12/2009 | Shoji | H02M 1/34 307/154 |
| 8,779,700 B1* | 7/2014 | Prodic | H02J 7/0014 318/139 |
| 9,214,868 B2* | 12/2015 | Jin | H02M 3/33576 |
| 9,667,157 B1* | 5/2017 | Dong | H02M 1/083 |
| 9,748,855 B2* | 8/2017 | Lee | H02M 3/33584 |
| 10,177,681 B2* | 1/2019 | Neumayr | H02M 7/483 |
| 10,673,343 B1 | 6/2020 | Tong et al. | |
| 2002/0191422 A1 | 12/2002 | Takagi et al. | |
| 2012/0153729 A1* | 6/2012 | Song | H02J 7/0013 307/82 |
| 2012/0163035 A1* | 6/2012 | Song | H02M 3/33584 363/17 |
| 2013/0272032 A1* | 10/2013 | Mueller | H02M 3/3387 363/17 |
| 2014/0035541 A1* | 2/2014 | Jin | G05F 1/70 323/210 |
| 2014/0140104 A1* | 5/2014 | Norrga | H02M 3/33584 363/17 |
| 2014/0146572 A1 | 5/2014 | Ye et al. | |
| 2014/0157015 A1* | 6/2014 | Zhan | G06F 1/32 713/320 |
| 2014/0198536 A1 | 7/2014 | Fu et al. | |
| 2014/0368167 A1 | 12/2014 | Okura et al. | |
| 2015/0023063 A1* | 1/2015 | Perreault | H02M 3/337 363/17 |
| 2015/0078053 A1 | 3/2015 | Harrison et al. | |
| 2015/0131330 A1* | 5/2015 | Pan | H02M 3/33584 363/17 |
| 2015/0207424 A1* | 7/2015 | Okamoto | H02M 5/452 363/17 |
| 2015/0229225 A1* | 8/2015 | Jang | H02M 3/33569 363/17 |
| 2015/0249394 A1 | 9/2015 | Liu et al. | |
| 2015/0263631 A1 | 9/2015 | Matsuura et al. | |
| 2015/0288284 A1 | 10/2015 | Lavieville | |
| 2016/0020702 A1* | 1/2016 | Trescases | H02M 3/33592 363/17 |
| 2016/0099646 A1* | 4/2016 | Safaee | H02M 3/33507 363/17 |
| 2016/0149502 A1* | 5/2016 | Dera | H02M 7/797 363/21.06 |
| 2016/0294294 A1* | 10/2016 | Ye | H02M 3/33592 |
| 2016/0344297 A1* | 11/2016 | Lee | H02M 3/33584 |
| 2017/0005589 A1* | 1/2017 | Moreno Munoz | H02M 7/483 |
| 2017/0358996 A1* | 12/2017 | Higaki | H02M 1/083 |
| 2017/0370977 A1 | 12/2017 | El-Barbari et al. | |
| 2018/0034359 A1* | 2/2018 | Chen | H02M 3/33592 |
| 2018/0048240 A1 | 2/2018 | Hayasaki et al. | |
| 2018/0152097 A1 | 5/2018 | Ying et al. | |
| 2018/0169781 A1 | 6/2018 | Ikejiri et al. | |
| 2018/0183345 A1* | 6/2018 | Itoh | H02M 3/07 |
| 2018/0262117 A1* | 9/2018 | Lu | H02M 7/797 |
| 2018/0294732 A1 | 10/2018 | Ye et al. | |
| 2018/0301989 A1* | 10/2018 | Yamagami | H02M 3/33576 |
| 2018/0331625 A1 | 11/2018 | Somani et al. | |
| 2018/0367051 A1* | 12/2018 | Agamy | H02M 3/33584 |
| 2019/0020271 A1 | 1/2019 | Fu et al. | |
| 2019/0052177 A1 | 2/2019 | Lu et al. | |
| 2019/0173387 A1 | 6/2019 | Tanaka | |
| 2019/0288606 A1* | 9/2019 | Higaki | H02J 7/0068 |
| 2020/0083727 A1* | 3/2020 | Sun | H02M 1/10 |
| 2020/0144926 A1* | 5/2020 | Murakami | H02M 3/33576 |
| 2020/0186046 A1* | 6/2020 | Tanaka | H02M 1/08 |
| 2020/0212816 A1* | 7/2020 | Sun | H02M 3/33584 |
| 2020/0220466 A1* | 7/2020 | Backman | H02M 1/10 |
| 2020/0228017 A1 | 7/2020 | Hu et al. | |
| 2021/0050769 A1* | 2/2021 | Xia | H02M 3/33584 |
| 2021/0058004 A1* | 2/2021 | Maki | H02M 3/33576 |

FOREIGN PATENT DOCUMENTS

| | | |
|---|---|---|
| CN | 201821269 U | 5/2011 |
| CN | 102299649 A | 12/2011 |
| CN | 202444423 U | 9/2012 |
| CN | 103701325 A | 4/2014 |
| CN | 105356758 A | 2/2016 |
| CN | 106817032 A | 6/2017 |
| CN | 108471238 A | 8/2018 |
| EP | 3086625 A2 | 10/2016 |

OTHER PUBLICATIONS

Filba-Martinez Alber et al: "Operating Principle and Performance Optimization of a Three-Level NPC Dual-Active-Bridge DC-DC Converter",IEEE Transactions on Inoustrial Electronics, IEEE Service Center, Piscataway, NJ, USA,vol. 63, No. 2, Feb. 1, 2016 (Feb. 1, 2016), pp. 678-690.

The EESR issued Jun. 17, 2020,from application No. 20152039.2.

The EESR issued Jun. 19, 2020,from application No. 20152059.0.

Gedeon Niyitegeka etc."Phase Shift Modulation and DC-Link's Voltage Balancing Control for a DAB DC-DC Converter".

Wei Liu etc."An Interleaved PWM Method With Better Voltage-Balancing Ability for Half-Bridge Three-Level DC/DC Converter".

The CN1OA issued Nov. 10, 2020 by the CNIPA from application No. 2019100409834.

The CN1OA issued Nov. 20, 2020 by the CNIPA from application No. 201910040952.9.

The Non-Final OA dated Jan. 15, 2021 by the USPTO from U.S. Appl. No. 16/739,700.

Zong Sheng et al.: "Three-level frequency-doubling LLC resonant converter with high step-down ratio for high input voltage applications", Mar. 16, 2014, pp. 14-19.

The 1st Office Action dated Sep. 13, 2021 for EP patent application No. 20152039.2.

* cited by examiner

DC/DC CONVERTER AND METHOD FOR CONTROLLING PHASE SHIFT ANGLE THEREOF

CROSS REFERENCE

The present application claims priority to Chinese Patent Application No. 201910040952.9, filed on Jan. 16, 2019, the entire contents of which are hereby incorporated by reference.

TECHNICAL FIELD

The present disclosure relates to the field of power supply technology, and in particular, to a control method of a DC/DC converter and the DC/DC converter as involved.

BACKGROUND

High-voltage DC/DC converters are widely used in high-power DC conversion systems, new energy storage systems, electric vehicle charging devices, rail transit power distribution systems, and the like. In order to reduce wire losses and costs, increase voltage levels, and reduce the number of cascade units, high-voltage DC/DC converter usually realizes high-voltage input by means of a three-level circuit. Affected by factors such as inconsistent hardware parameters, the voltage of the neutral point of the three-level circuit may appear unbalanced, which affects the safety of the device and the normal operation of the converter. Thus, the voltage of the neutral point must be subject to balance control.

Therefore, a need exists for a control method of a DC/DC converter capable of performing adjustment on the voltage of the neutral point (neutral point balance) of the DC/DC converter.

It should be noted that the information disclosed in the background section above is only used to enhance the understanding of the background of the disclosure, and therefore may include information that does not constitute the prior art known to those of ordinary skill in the art.

SUMMARY

The present disclosure is directed to provide a control method of a DC/DC converter and a control device of the DC/DC converter, thereby adjusting balance of the voltage of the neutral point for the DC/DC converter.

According to a first aspect of the disclosure, there is provided a control method of a DC/DC converter, applied to a DC/DC converter, the DC/DC converter including: a first capacitor and a second capacitor coupled to a first node, a second end of the first capacitor being coupled to a second node, and a second end of the second capacitor being coupled to a third node; a first bridge arm coupled between the first node and the second node and a second bridge arm coupled between the first node and the third node, the first bridge arm including a first switch and a second switch coupled to a fourth node, the second bridge arm including a third switch and a fourth switch coupled to a fifth node; a transformer having a primary winding electrically connected to the fourth node and the fifth node, and a secondary side circuit electrically connected to a secondary winding of the transformer, wherein the method includes:

outputting a first control signal, a second control signal, a third control signal, and a fourth control signal to control ends of the first switch, the second switch, the third switch, and the fourth switch, wherein the first control signal, the second control signal, the third control signal, and the fourth control signal are square wave signals having a preset period, the first control signal is complementary to the second control signal, the third control signal is complementary to the fourth control signal, a first phase shift angle exists between the first control signal and the fourth control signal, and the first phase shift angle exists between the second control signal and the third control signal; and controlling the first phase shift angle to reduce a voltage difference between the first capacitor and the second capacitor.

According to a second aspect of the disclosure, there is provided a DC/DC converter, including:

a first capacitor, having a first end coupled to a first node and a second end coupled to a second node;

a second capacitor, having a first end coupled to the first node and a second end coupled to a third node;

a first bridge arm, coupled between the first node and the second node, including a first switch and a second switch coupled to a fourth node;

a second bridge arm, coupled between the first node and the third node, including a third switch and a fourth switch coupled to a fifth node;

a transformer, having a primary winding electrically connected to the fourth node and the fifth node;

a secondary side circuit, electrically connected to a secondary winding of the transformer;

a processor, coupled to the first capacitor, the second capacitor, the first bridge arm, the second bridge arm and the secondary side circuit, and configured to:

output a first control signal, a second control signal, a third control signal, and a fourth control signal to control ends of the first switch, the second switch, the third switch, and the fourth switch, wherein the first control signal, the second control signal, the third control signal, and the fourth control signal are square wave signals having a preset period, the first control signal is complementary to the second control signal, the third control signal is complementary to the fourth control signal, a first phase shift angle exists between the first control signal and the fourth control signal, and the first phase shift angle exists between the second control signal and the third control signal; and control the first phase shift angle to reduce a voltage difference between the first capacitor and the second capacitor.

It should be understood that the above general description and the following detailed description are merely exemplary and explanatory, and should not limit the present disclosure.

BRIEF DESCRIPTION OF THE DRAWINGS

The accompanying drawings herein are incorporated in and constitute a part of this specification, illustrate embodiments conforming to the present disclosure and together with the description serve to explain the principles of the present disclosure. Apparently, the accompanying drawings in the following description show merely some embodiments of the present disclosure, and persons of ordinary skill in the art may still derive other drawings from these accompanying drawings without creative efforts.

DETAILED DESCRIPTION

Figure 1:
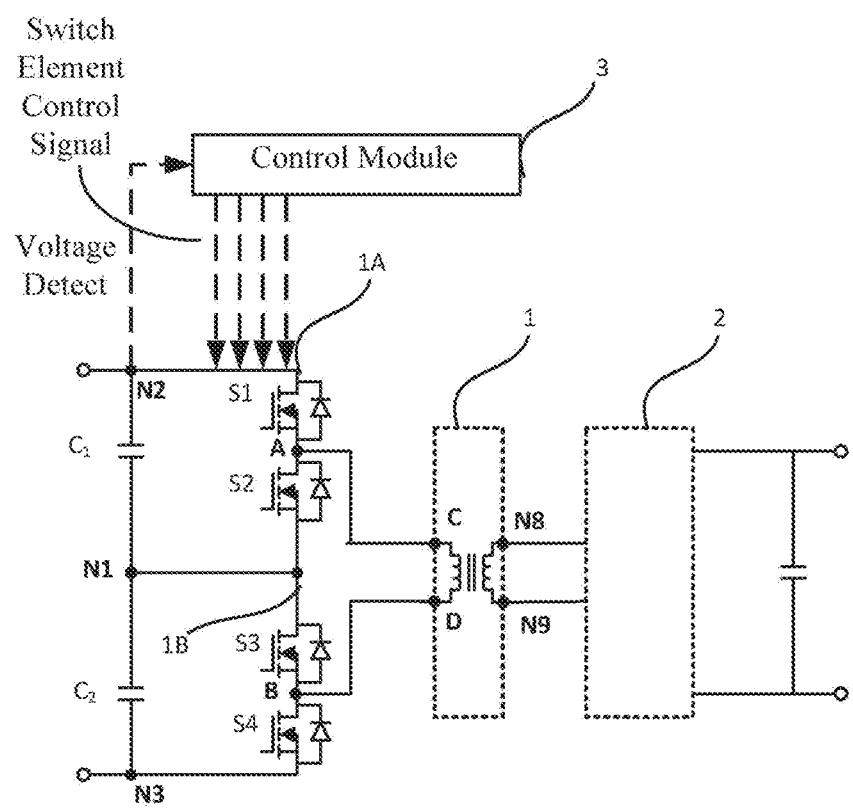
FIG. 1 is a schematic diagram illustrating a DC/DC converter using a three-level circuit.

Exemplary embodiments will be described more comprehensively by referring to accompanying drawings now. However, the exemplary embodiments can be embodied in many forms and should not be construed as limited to the embodiments set forth herein; rather, these embodiments are provided so that this disclosure will be made thorough and complete, and the concept of exemplary embodiments will be fully conveyed to those skilled in the art. Furthermore, the described features, structures, or characteristics may be combined in any suitable manner in one or more embodiments. In the following description, numerous specific details are provided to provide a thorough understanding of the embodiments of the present disclosure. Those skilled in the art will recognize, however, that the technical solution of the present disclosure may be practiced without one or more of the specific details described, or that other methods, components, materials, etc. may be employed. In other instances, well-known technical solutions are not shown or described in detail to avoid obscuring aspects of the present disclosure.

Furthermore, the accompanying drawings are merely schematic illustrations of the present disclosure. Same or similar parts are denoted by same reference numbers in the drawings and, thus, a detailed description thereof will be omitted. Some block diagrams shown in the figures are functional entities and not necessarily to be corresponding to a physically or logically individual entities. These functional entities may be implemented in software form, or implemented in one or more hardware modules or integrated circuits, or implemented in different networks and/or processor apparatuses and/or microcontroller apparatuses.

A detailed description of the exemplary embodiments of the present disclosure will be made in the following with reference to the accompanying drawings.

FIG. 1 is a schematic diagram illustrating a DC/DC converter using a three-level circuit.

Referring to FIG. 1, the DC/DC converter 100 may include:

a first capacitor C1, having a first end coupled to a first node N1, and a second end coupled to a second node N2;

a second capacitor C2, having a first end coupled to the first node N1, and a second end coupled to a third node N3;

a first bridge arm 1A, coupled between the first node N1 and the second node N2, and including a first switch S1 and a second switch S2 connected in series, the first switch S1 and the second switch S2 being coupled to a fourth node A;

a second bridge arm 1B, coupled between the first node N1 and the third node N3, and including a third switch S3 and a fourth switch S4 connected in series, the third switch S3 and the fourth switch S4 being coupled to a fifth node B;

a transformer 1, having a primary winding electrically connected to the fourth node A and the fifth node B, respectively, through a sixth node C and a seventh node D;

a secondary side circuit 2, electrically connected to a secondary winding of the transformer 1 through an eighth node N8 and a ninth node N9;

a processor 3, coupled to the first capacitor C1, the second capacitor C2, the first bridge arm 1A, the second bridge arm 1B and the secondary side circuit 2, and configured to output a first control signal, a second control signal, a third control signal, and a fourth control signal to control ends of the first switch S1, the second switch S2, the third switch S3, and the fourth switch S4, wherein the first control signal, the second control signal, the third control signal, and the fourth control signal are square wave signals having a preset period, the first control signal is complementary to the second control signal, the third control signal is complementary to the fourth control signal, a first phase shift angle exists between the first control signal and the fourth control signal, and the first phase shift angle exists between the second control signal and the third control signal; and control the first phase shift angle to reduce a voltage difference between the first capacitor and the second capacitor.

Figure 2:
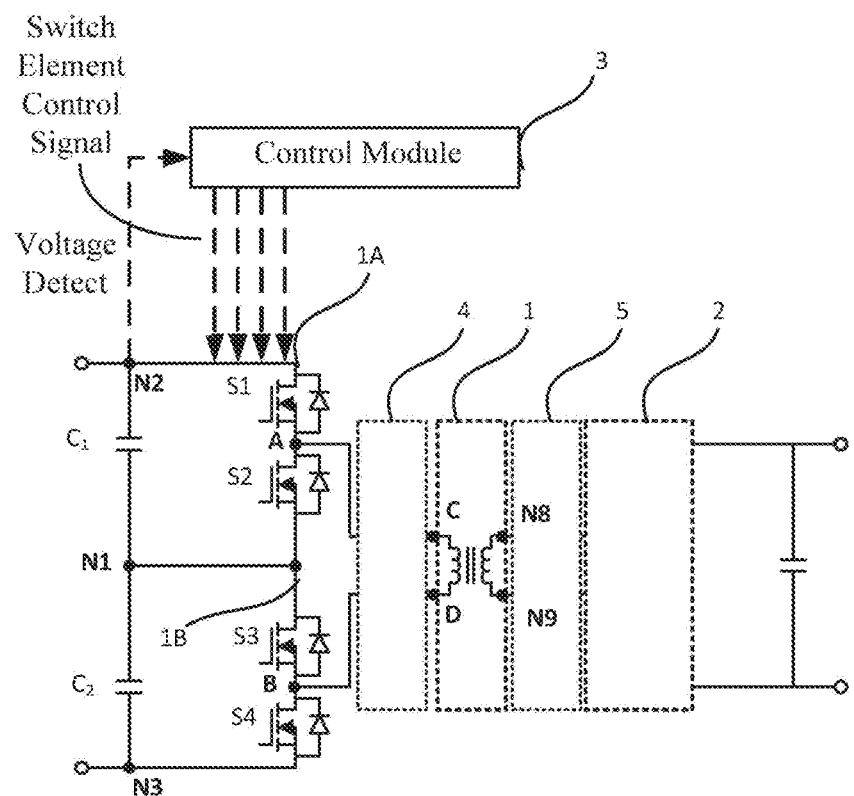
FIG. 2 is a schematic diagram illustrating another structure of the DC/DC converter using a three-level circuit shown in FIG. 1.

FIG. 2 is a schematic diagram illustrating another structure of the DC/DC converter using a three-level circuit shown in FIG. 1.

Referring to FIG. 2, the DC/DC converter 100 may further include only a first passive network 4 or a second passive network 5, or may include both the first passive network 4 and the second passive network 5. The first passive network 4 is coupled between the fourth node A, the fifth node B, and the primary winding of the transformer 1, and the second passive network 5 is coupled between the secondary winding of the transformer 1 and the secondary side circuit 2. A circuit structure of the first passive network and/or the second passive network may include only a capacitor or a network composed of a capacitor and an inductor connected in series, parallel, or series-parallel, and the disclosure is not limited thereto.

Typical three-level circuits include two structures, a diode neutral point clamp (DNPC) and a series dual half-bridge (SHB). In FIG. 1 and FIG. 2, the first bridge arm and the second bridge arm are two half bridges connected in series by four active devices in series, which may be referred to as the series dual half-bridge (SHB) structure. The SHB structure is composed of 4 switches, which can output three levels of +2, +1 and 0. For DC/DC converters, the series dual half-bridge structure is simple and the system efficiency is high.

Figure 3:
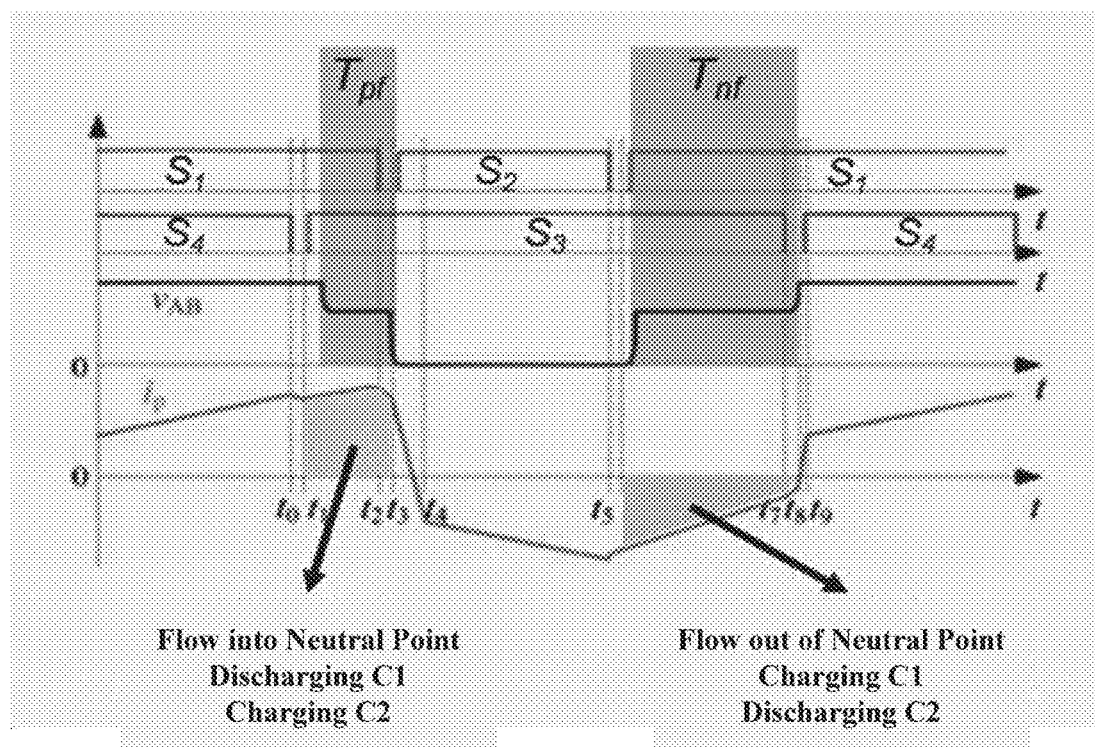
FIG. 3 is a schematic diagram illustrating a method of neutral point balance in the related art.

In order to solve the problem of the neutral point balance control of a three-level circuit, there is proposed a neutral point control method based on duty cycle modulation in related art. As shown in FIG. 3, the control signals of the first switch S1 and the second switch S2 are turned on in a complementary manner, and the control signals of the third switch S3 and the fourth switch S4 are turned on in a complementary manner. The duty cycle of the control signals of S1 and S3 is greater than 50%, and the duty cycle of the control signals of S2 and S4 is less than 50%. During the period of t1-t2, the control signals of S1 and S3 are turned on to generate level 1, the primary side current of the transformer is positive, and the current flows into the neutral point (the first node N1) through S1 and S3. During the period of t6-t7, the control signals of S1 and S3 are turned on to generate level 1, the primary side current of the transformer is negative, and the current flows out of the neutral point (the first node N1) through S1 and S3. In a switching period, the two level-1 states have opposite effects on the neutral point, so the neutral point balance can be controlled by adjusting the effective time difference of level 1 between the positive and negative half period. When Tpf<Tnf, in one switching period, the current flowing out of the neutral point is larger than the current flowing into the neutral point, causing the voltage Udc2 of the lower half capacitor to decrease and the voltage Udc1 of the upper half capacitor to increase, thereby realizing the adjustment of the voltage of the neutral point.

In this control method, the positive and negative half period of level 1 are not equal in effective time, the converter's operating mode is asymmetric in one switching period, and the turn-off current of each switch is different, thus it is difficult to ensure that all switches achieve zero voltage switching (ZVS), conduction loss and switching loss are uneven, thereby affecting thermal design. Therefore, the adjustment performance is poor when the neutral point balance is controlled relying on the time difference of level 1.

In view of the problems in the related art, the control method proposed by the s15 present disclosure has stronger neutral point balance adjustment capability, without affecting the realization of the converter's zero voltage switching (ZVS), the method can balance the switching loss and the conduction loss of the switches, and is applicable to various types of resonant or non-resonant, unidirectional or bidirectional DC/DC circuits with a primary side having a series dual half-bridge three-level structure.

Figure 4:
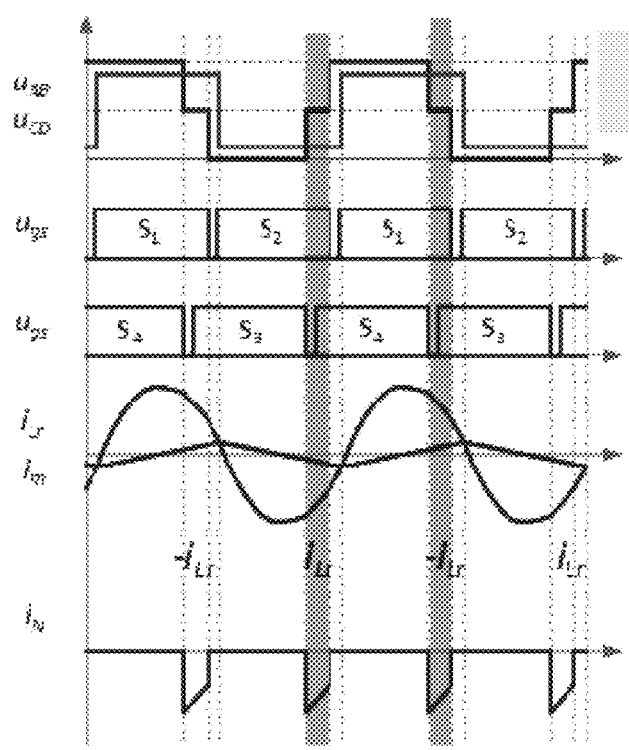
FIG. 4 is a schematic diagram illustrating a control method provided by the present disclosure.

FIG. 4 is a schematic diagram illustrating a control method provided by the present disclosure. The control method shown in FIG. 4 can be applied to the circuits shown in FIGS. 1 and 2.

In FIG. 4, Ugs is the control signal level of respective switch, $i_{Lr}$ is the current flowing through the secondary side, $i_m$ is the excitation current of transformer 1, and $i_N$ is the current at the first node, that is, the neutral point current. The gray part in the drawing is the first phase shift angle.

Referring to FIG. 4, in the embodiment of the present disclosure, it is controlled in such a way that the control signals of the first switch S1 and the second switch S2 are turned on in a complementary manner, and the control signals of the third switch S3 and the fourth switch S4 are turned on in a complementary manner. Ideally, ignoring the dead zone, the duty cycle of all switch control signals is 50%. There is a first phase shift angle φx between the control signals of the switches S1 and S2 of the first bridge arm 1A and the control signals of the switches S3 and S4 of the second bridge arm 1B. It is defined that the phase shift angle is positive when conduction of S4 lag conduction of S1, and the phase shift angle is negative when conduction of S4 is ahead of conduction of S1. In the embodiments of the present disclosure, this method is referred to as a phase-shift modulation method.

Regardless of the dead time, four working modes may be formed by the series dual half-bridge three-level bridge arm in one switching period. The first phase shift angle will be taken as an example, referring to FIGS. 5A to 5D.

Figure 5A:
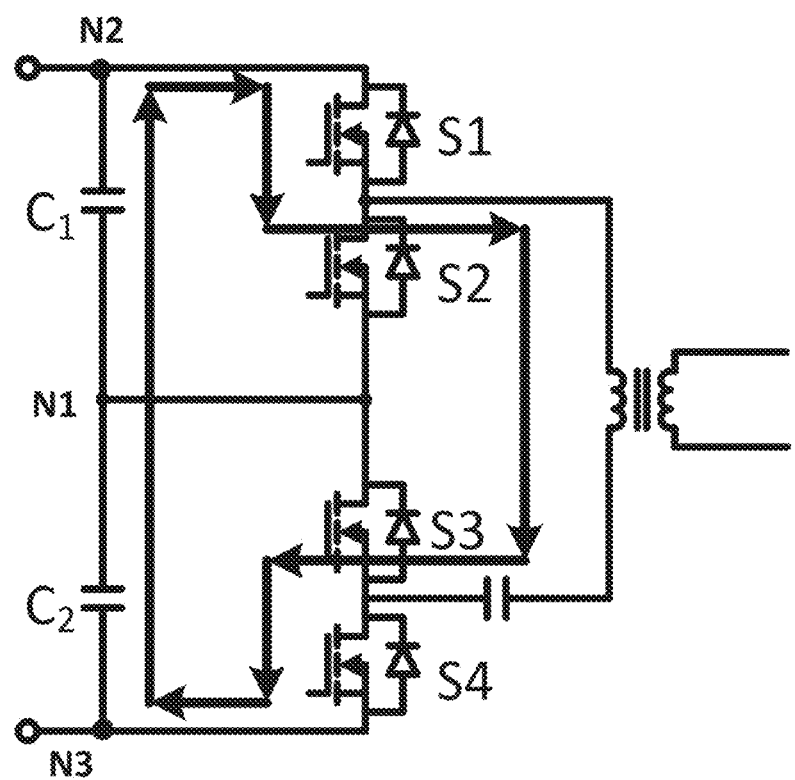
FIGS. 5A-5D are schematic diagrams illustrating four switching modes of a series dual half-bridge three-level circuit.

In FIG. 5A, when S1 and S4 are turned on at the same time, two input capacitors C and C2 are connected in series to the converter. The total output voltage of the first bridge arm and the second bridge arm is ($U_{dc1}$+$U_{dc2}$) and the output level is 2. The neutral point (first node N1) is not connected to the circuit and, thus the voltage of the neutral point would not be affected in this mode.

Figure 5B:
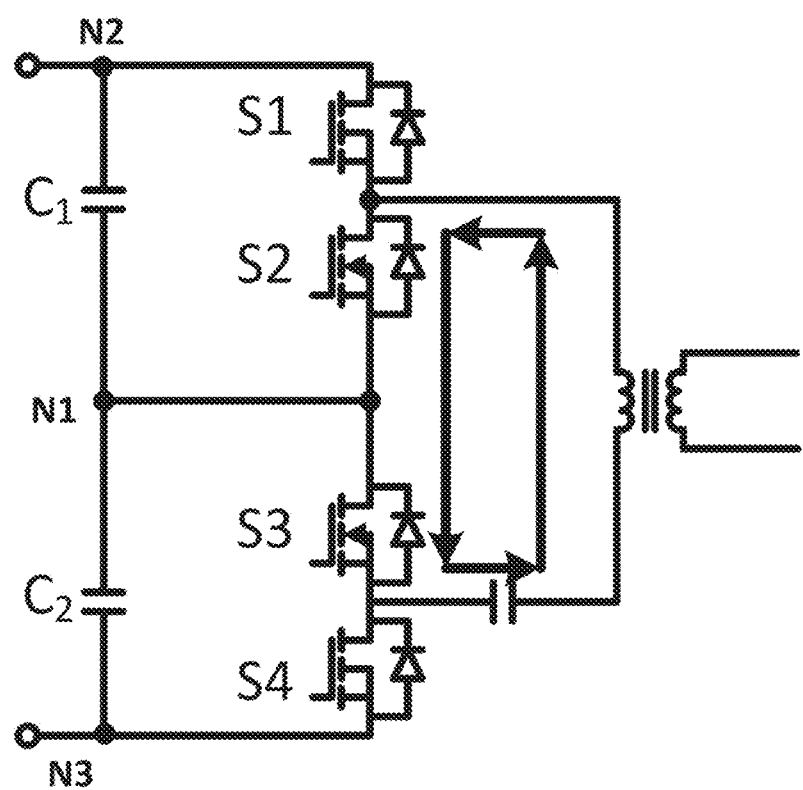

In FIG. 5B, when S2 and S3 are turned on at the same time, the two input capacitors C1 and C2 are not connected to the converter. The total output voltage of the first bridge arm 1A and the second bridge arm 1B is 0, and the output level is 0. The neutral point (first node N1) is not connected to the circuit and, thus the voltage of the neutral point would not be affected in this mode.

Figure 5C:
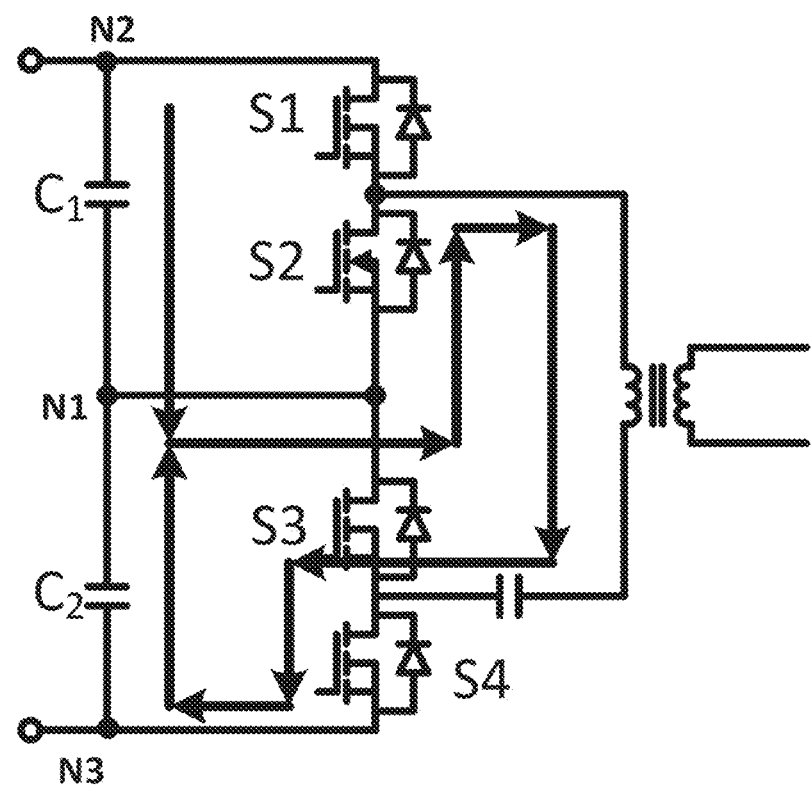

In FIG. 5C, when S1 and S3 are turned on at the same time, the total output voltage of the first bridge arm 1A and the second bridge arm 1B is $U_{dc1}$, the output level is 1. The neutral point (first node N1) is connected to the circuit, and the primary side current of the converter flows out of the neutral point through the two switches S1 and S3.

Figure 5D:
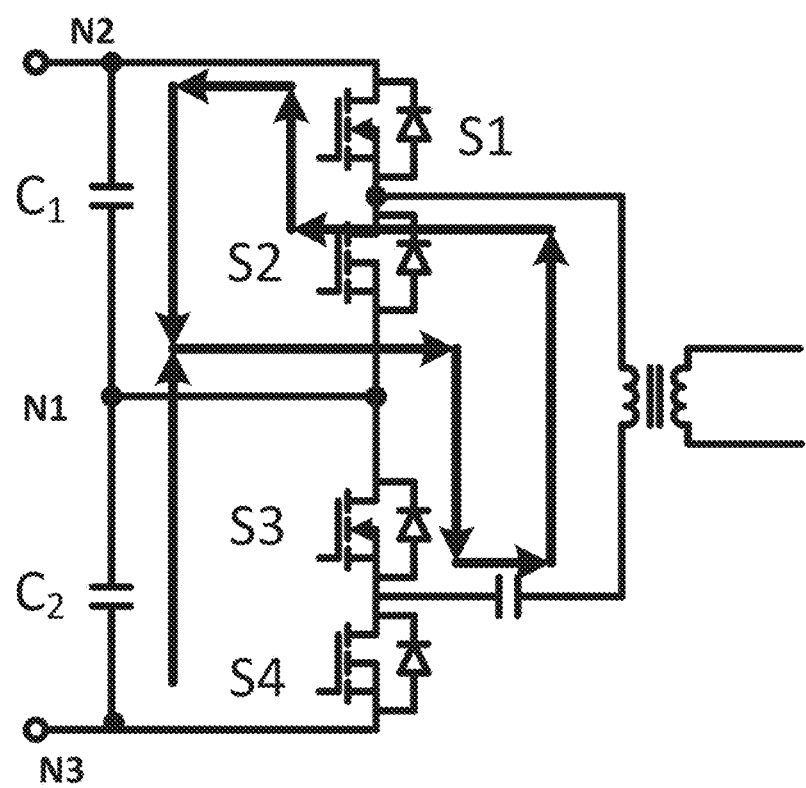

In FIG. 5D, when S2 and S4 are turned on at the same time, the total output voltage of the first bridge arm 1A and the second bridge arm 1B is $U_{dc2}$, the output level is 1. The neutral point (first node N1) is connected to the circuit, and the primary side current of the converter flows out of the midpoint through the two switches S2 and S4.

In the above four switching modes, level 0 and level 2 have no effect on the voltage of the neutral point. When the primary side circuit works in the 0/2 two-level modulation mode, the converter itself does not have the ability to adjust the neutral point. Therefore, when the neutral point balance adjustment is required, the level 1 mode must be used reasonably to adjust the voltage of the neutral point.

In the control method shown in FIG. 4, the series dual half-bridge three-level bridge arm undergoes two level 1 modes in one switching period. When the first phase shift angle is positive, the current is always in a direction of flowing out of the neutral point, the upper half capacitor C1 is charged, and the lower half capacitor C2 is discharged, thereby causing the voltage of the neutral point to fall and the voltage difference between the two capacitors to decrease. When the phase shift angle is negative, the current is always in a direction of flowing into the neutral point, the lower half capacitor C1 is charged, and the upper half capacitor C2 is discharged, thereby causing the voltage of the neutral point to rise and the voltage difference between the two capacitors to decrease.

Therefore, the direction of the current flowing through the neutral point depends on the phase shift angle between the control signals of the two bridge arms. The larger the phase shift angle, the longer the time on which the level 1 acts, the longer the time on which the current flows through the neutral point, the higher the average current value of the neutral point, and the stronger the adjustment capability.

Figure 6:
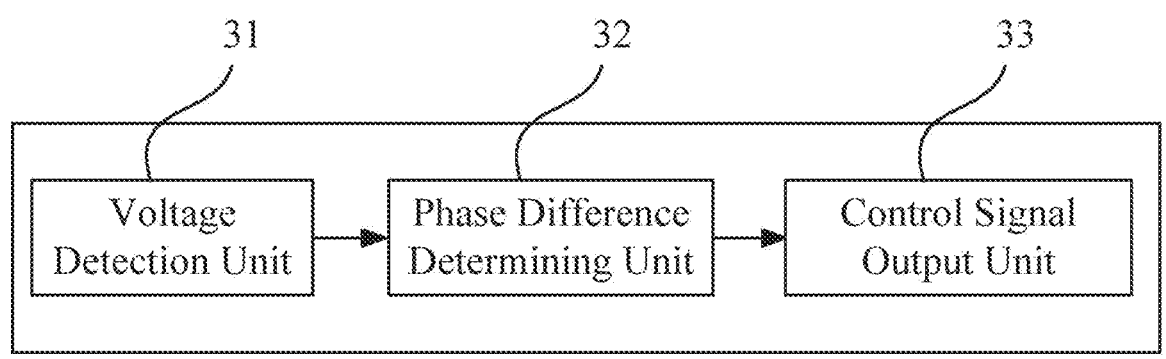
FIG. 6 is a block diagram illustrating a processor of the DC/DC converter provided by the present disclosure.

Referring to FIG. 6, in an embodiment of the present disclosure, the controller 3 of the DC/DC converter may include:

a voltage detection unit 31, configured to detect a first voltage across the first capacitor and a second voltage across the second capacitor;

a phase difference determining unit 32, configured to determine the first phase shift angle according to the difference between the first voltage and the second voltage, reduce the first phase shift angle when the difference is a positive value, and increase the first phase shift angle when the difference is a negative value;

a control signal output unit 33, configured to output a first control signal, a second control signal, a third control signal, and a fourth control signal according to the first phase shift angle, so as to control the on and off of the first to fourth switches S1 to S4.

Figure 7:
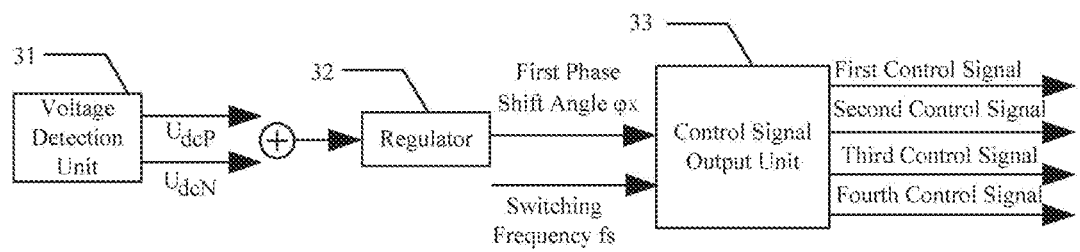
FIG. 7 is a schematic diagram illustrating signal relationships of the processor in FIG. 6.

Referring to FIG. 7, in the embodiment of the present disclosure, the phase difference determining unit 32 may be, for example, a regulator. The control signal output unit 33 receives an input of a first phase shift angle determined by the regulator and a switching frequency, so as to generate and output the first control signal to the fourth control signal.

Compared with related art, the DC/DC converter control method based on phase shift modulation proposed by embodiments of the present disclosure has at least the following advantages.

1. The working modes of the positive and negative half control periods are completely symmetrical, the positive and negative half control periods have the same effect on the neutral point and, through superposition, may obtain a stronger adjustment ability. 2. The current at the primary side circuit of the transformer is symmetrical, which is beneficial for the switches in the primary side circuit to achieve ZVS. 3. The stress and loss of the four switches in the primary side circuit may be made uniform, thereby improving energy efficiency.

Figure 8:
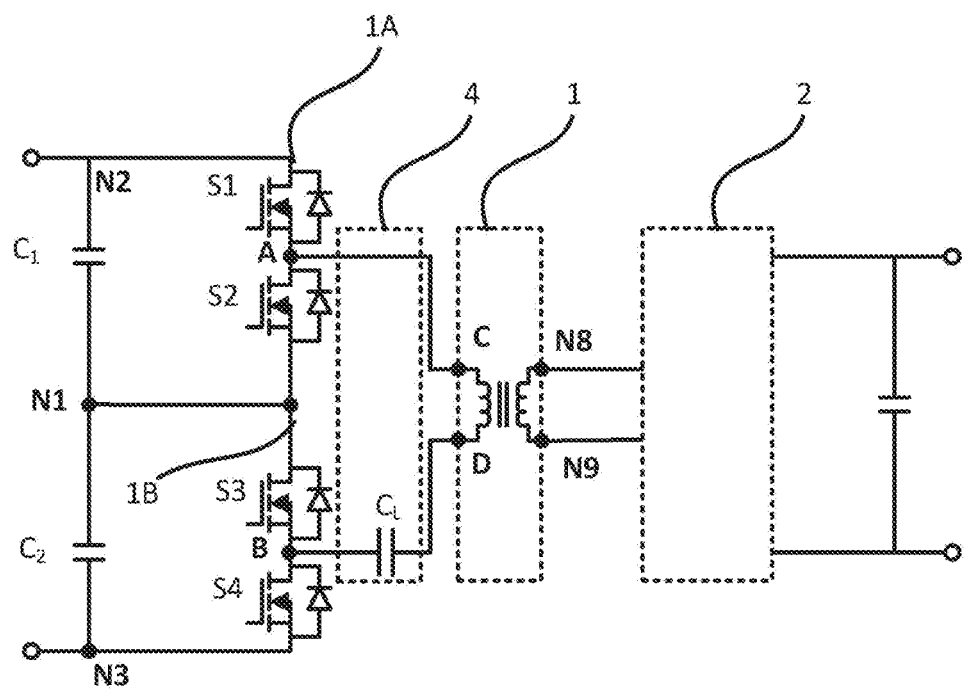
FIG. 8 is a schematic diagram illustrating a passive network structure according to an embodiment of the present disclosure.

FIG. 8 is a schematic diagram illustrating a passive network structure in an embodiment of the present disclosure.

Referring to FIG. 8, in one embodiment, the first passive network 4 may include:

a resonant capacitor CL, coupled to the fourth node A and connected in series with the primary winding of the transformer 1 through the sixth node C, or coupled to the fifth node B and connected in series with the primary winding of the transformer 1 through the seventh node D. The resonance capacitor CL may form a resonance circuit with an excitation inductance and a leakage inductance of the transformer 1.

In the embodiment shown in FIG. 8, the primary winding of the transformer 1 is electrically connected to the series dual half-bridge three-level circuit (including the first capacitor C1, the second capacitor C2, the first bridge arm 1A, and the second bridge arm 1B) through the first passive network 4. The first passive network 4 may only include a resonance capacitor, and form a resonance network with the excitation inductance and leakage inductance of the transformer 1. At this time, no matter what kind of circuit form the secondary side circuit 2 is, the control method shown in FIG. 4 can be applied to adjust the voltage of the neutral point of the series dual half-bridge three-level circuit.

Figure 9:
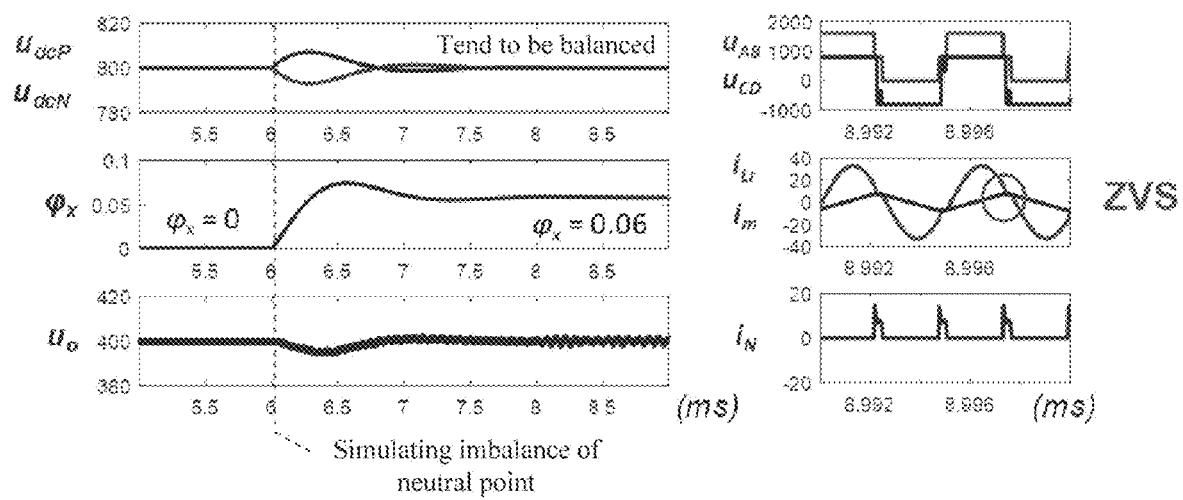
FIG. 9 is a simulation waveform when the control method is applied to the circuit shown in FIG. 8.

FIG. 9 is a simulation waveform when the control method is applied to the circuit shown in FIG. 8.

Referring to FIG. 9, the simulation conditions are that frequency modulation control is applied to the LLC voltage conversion circuit, and the output voltage Uo is set to a constant voltage. At a time point of 6 ms, the neutral point imbalance was simulated, the voltages of the two input capacitors are set in such a way that the first voltage $U_{dcP}$ rises and the second voltage $U_{dcN}$ falls. The control method shown in FIG. 4 is applied to determine the polarity (positive or negative) and amplitude of the first phase shift angle φx, and the first phase shift angle is adjusted according to the voltage difference between the two input capacitors. After a period of time, the first phase shift angle φx increases, and the duration of the level 1 mode increases, so the neutral point current in increases during the level 1 mode, the neutral point voltage decreases, and the voltages of the two input capacitors tend to be balance again.

In other embodiments, the first passive network 4 may also be a series resonant network or a parallel resonant network, and may include an inductor and a capacitor.

Figure 10:
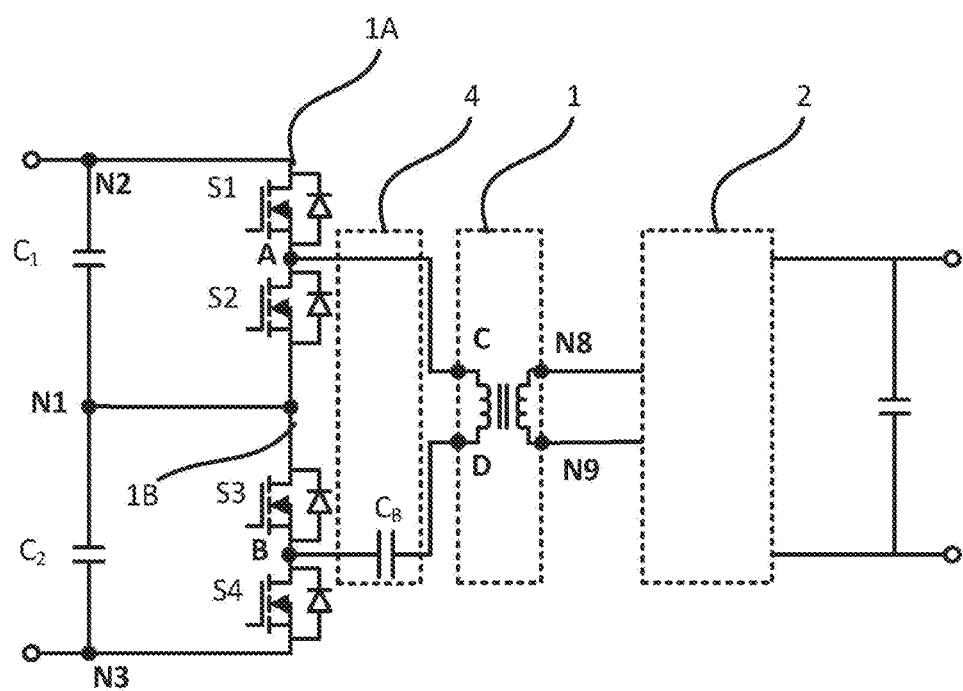
FIG. 10 is a schematic diagram illustrating another passive network structure according to an embodiment of the present disclosure.

FIG. 10 is a schematic diagram illustrating another passive network structure 4 according to an embodiment of the present disclosure.

Referring to FIG. 10, in another embodiment, the first passive network 4 may include:

a DC blocking capacitor CB, coupled to the fourth node A and connected in series with the primary winding of the transformer 1 through the sixth node C, or coupled to the fifth node B and connected in series with the primary winding of the transformer 1 through the seventh node D. The capacitance of the DC-blocking capacitor CB is large and does not resonate with the excitation inductance and leakage inductance of the transformer 1.

In the embodiment shown in FIG. 10, the primary side circuit of the transformer is a DAB circuit of a series dual half-bridge circuit. At this time, the magnitude and direction of the output power can be controlled by adjusting the phase shift angle between the primary side switch signal and the secondary side switch signal. When modulation of the secondary side circuit lags the primary side circuit, the power flows in a forward direction (from the left side of the transformer to the right side of the transformer); when modulation of the secondary side circuit is ahead of the primary side circuit, the power flows in a reverse direction.

Figure 11:
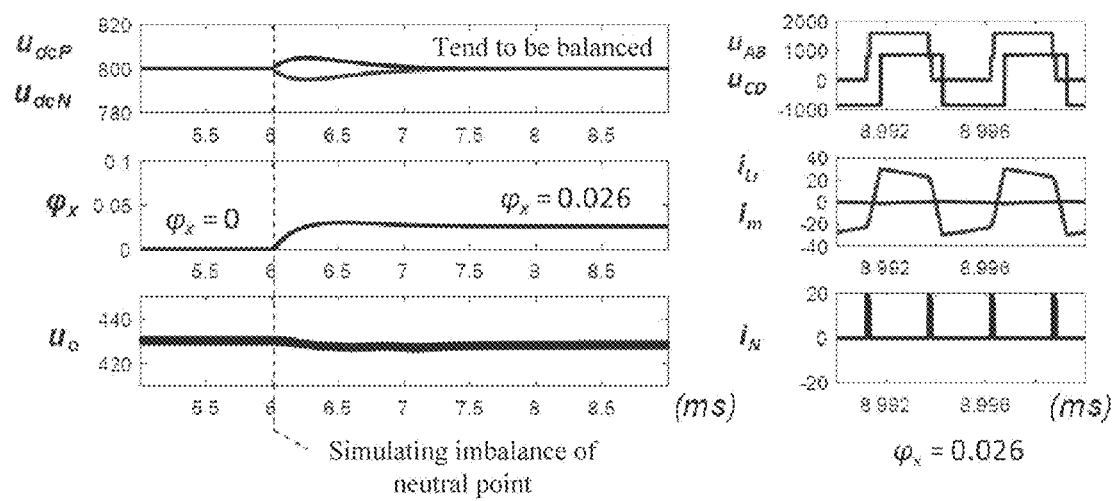
FIG. 11 is a simulation waveform when the control method is applied to the circuit shown in FIG. 10 with a power flow in a forward direction.

FIG. 11 is a simulation waveform when the control method is applied to the circuit shown in FIG. 10 with a power flow in a forward direction.

Referring to FIG. 11, when $u_{CD}$ lags behind $u_{AB}$, the DAB circuit runs in a forward direction. At a time point of 6 ms, the neutral point imbalance was simulated. The voltages of the two input capacitors are set in such a way that the first voltage $U_{dcP}$ rises and the second voltage $U_{dcN}$ falls. The control method shown in FIG. 4 is applied to determine the polarity (positive or negative) and the amplitude of the first phase shift angle φx, and the first phase shift angle φx is increased according to the voltage difference between the two input capacitors, thereby increasing the duration of the level 1 mode. So, the neutral point current $i_N$ increases during the level 1 mode, the neutral point voltage decreases and, after a period of time, the voltages of the two input capacitors tend to be balance again.

Figure 12:
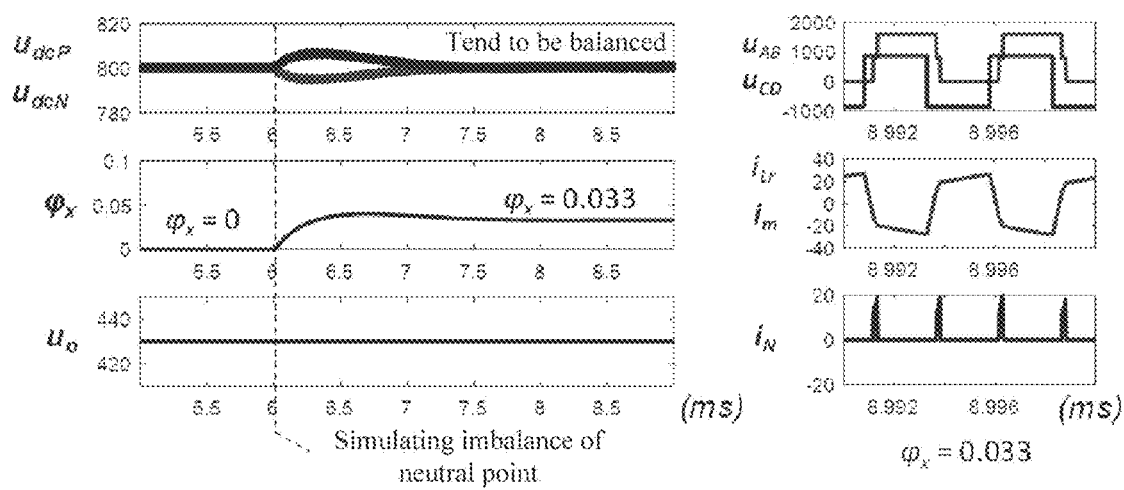
FIG. 12 is a simulation waveform when the control method is applied to the circuit shown in FIG. 10 with a power flow in a reverse direction.

FIG. 12 is a simulation waveform when the control method is applied to the circuit shown in FIG. 10 with a power flow in a reverse direction.

Referring to FIG. 12, when $u_{CD}$ is ahead of $u_{AB}$, the DAB circuit operates in a reverse direction. Similarly, the control method shown in FIG. 4 can be applied to achieve the voltage balance control of the input capacitor.

The neutral point balance control method (controlling voltage balance of the input capacitors) provided by the embodiments of the present disclosure can be applied to a voltage conversion circuit in which the secondary side circuit 2 of the transformer has various forms.

Figure 13:
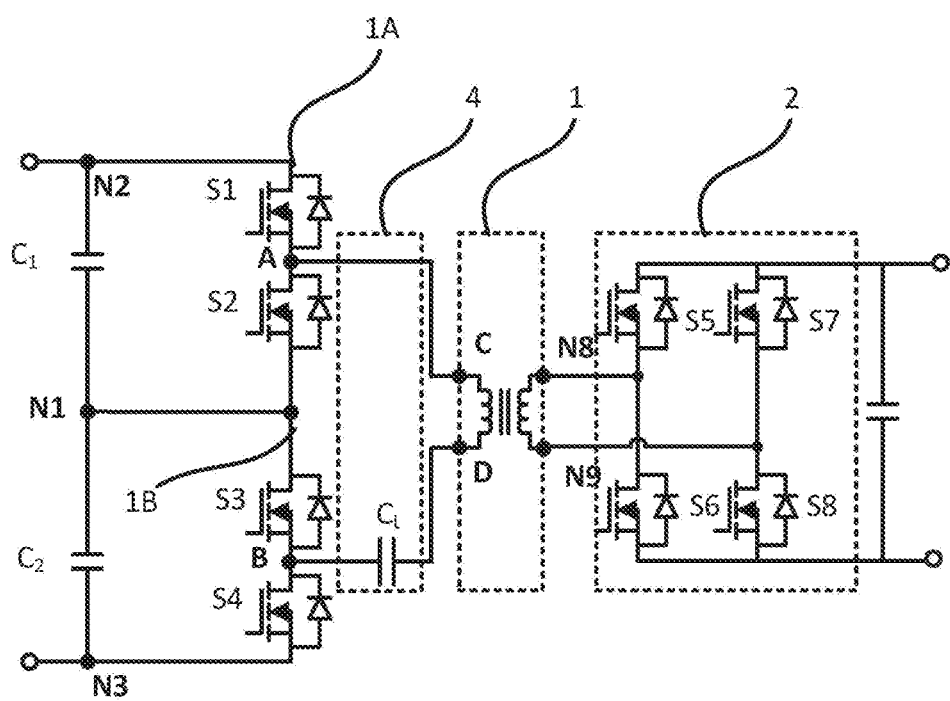
FIG. 13 is a schematic diagram illustrating a secondary side circuit having a full-bridge structure.

FIG. 13 is a schematic diagram illustrating a structure of the secondary side circuit 2.

Referring to FIG. 13, the secondary side circuit 2 may be a full-bridge rectification circuit, including:

a fourth bridge arm 2A, including a fifth switch S5 and a sixth switch S6 coupled to the eighth node N8; and a fifth bridge arm 2B, including a seventh switch S7 and an eighth switch S8 coupled to the ninth node N9.

The fifth switch S5 and the seventh switch S7 are coupled to the tenth node N10, the sixth switch S6 and the eighth element S8 are coupled to the eleventh node N11, and the secondary side circuit 2 is electrically connected to the secondary winding of the transformer 1 through the eighth node N8 and the ninth node N9.

In some embodiments, the eighth node N8 and the ninth node N9 may be directly coupled to the secondary winding of the transformer 1, or may be electrically connected to the secondary winding of the transformer 1 through the second passive network 5. The circuit form of the second passive network 5 may be the same as or different from that of the first passive network 4, and is not limited by the disclosure.

In the embodiment shown in FIG. 13, the primary side circuit of the transformer is a series dual half-bridge circuit, and the control method shown in FIG. 4 can be applied to adjust balance of the voltage of the neutral point in the primary side circuit. The output ports of the two bridge arms 1A and 1B are connected to the primary winding of the transformer 1 through the first passive network 4 (the structure of the first passive network 4 is not limited), and the secondary side circuit 2 is a full-bridge rectification circuit.

Figure 14:
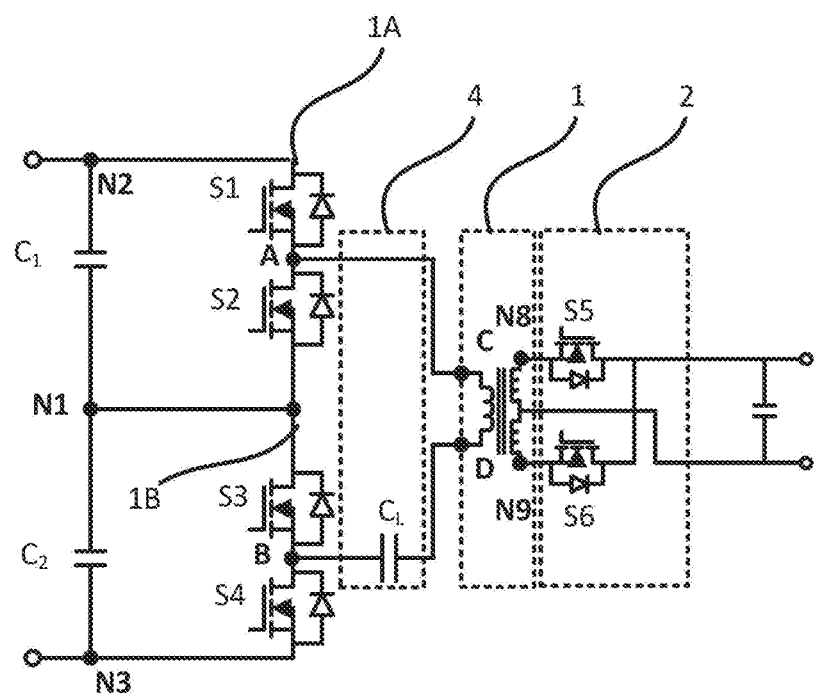
FIG. 14 is a schematic diagram illustrating a secondary side circuit having a full-wave rectification structure.

FIG. 14 is a schematic diagram illustrating another circuit structure of the 15s secondary side circuit 2.

Referring to FIG. 14, the secondary side circuit 2 of the transformer may be a full-wave rectification circuit, including:

a fifth switch S5, having a first end electrically connected to one end of the secondary winding of the transformer 1 through the eighth node N8; and a sixth switch S6, having a first end electrically connected to the other end of the secondary winding of the transformer 1 through the ninth node N9, and a second end coupled to a second end of the fifth switch S5.

In the embodiment shown in FIG. 14, the primary side circuit of the transformer is a series dual half-bridge circuit, and the phase shift modulation method shown based on FIG. 4 can be applied to adjust balance of the voltage of the neutral point. The output ports of the two bridge arms 1A and 1B are connected to the primary winding of the transformer 1 through the first passive network 4 (the structure of the passive network is not limited), and the secondary side circuit 2 is a full-wave rectification circuit.

In this embodiment, when the secondary side circuit 2 is a rectification circuit as shown above, uncontrolled rectification or synchronous rectification, or other modulation methods may be applied to the secondary side circuit 2.

Figure 15:
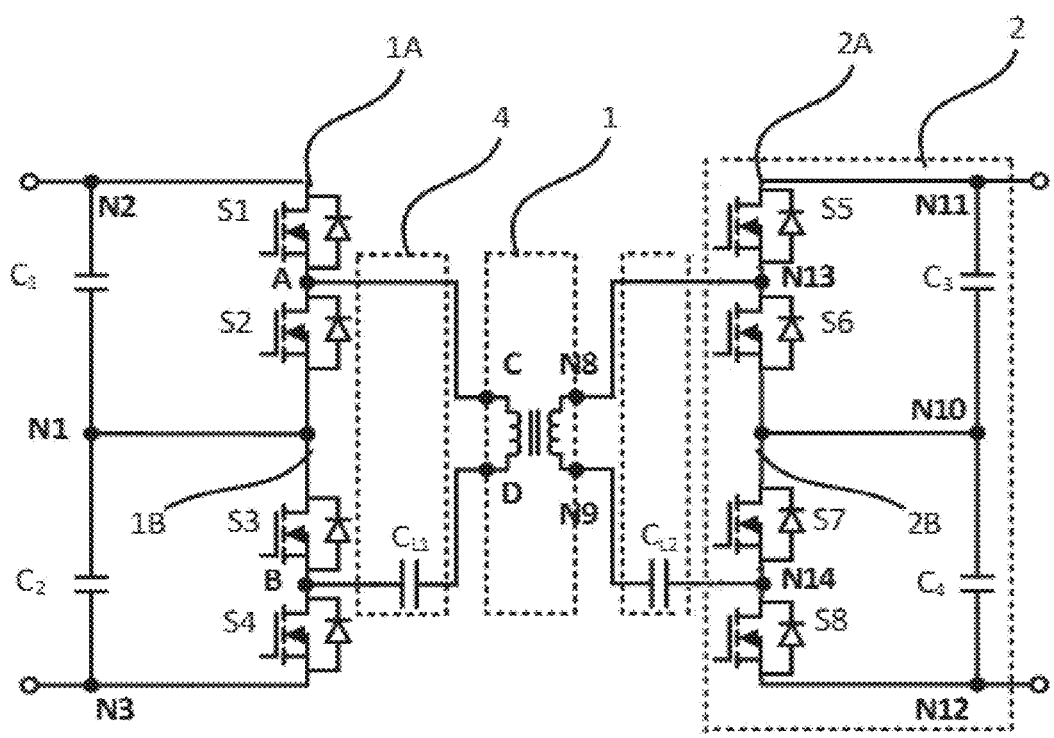
FIG. 15 is a schematic diagram illustrating a secondary side circuit having a series dual half-bridge structure.

FIG. 15 is a schematic diagram illustrating yet another circuit structure of the secondary side circuit 2.

Referring to FIG. 15, in an embodiment, the secondary side circuit 2 may also be a series dual half-bridge (SHB) structure, including:

a third capacitor C3 and a fourth capacitor C4 coupled to a tenth node N10, a second end of the third capacitor C3 being coupled to an eleventh node N11, and a second end of the fourth capacitor C4 being coupled to a twelfth node N12; and a third bridge arm 2A coupled between the tenth node N10 and the eleventh node N11, and a fourth bridge arm 2B coupled between the twelfth node N12 and the tenth node N10. The third bridge arm 2A includes a fifth switch S5 and a sixth switch S6 coupled to a thirteenth node N13. The fourth bridge arm 2B includes a seventh switch S7 and an eighth switch S8 coupled to a fourteenth node N14. The secondary side circuit 2 is electrically connected to the secondary winding of the transformer 1 through the thirteenth node N13 and the fourteenth node N14.

In the embodiment shown in FIG. 15, the control method may further include:

outputting a fifth control signal, a sixth control signal, a seventh control signal, and an eighth control signal to control ends of the fifth switch, the sixth switch, the seventh switch and the eighth switch, wherein the fifth control signal, the sixth control signal, the seventh control signal, and the eighth control signal are square wave signals having a preset period, the fifth control signal is complementary to the sixth control signal, the seventh control signal is complementary to the eighth control signal, a second phase shift angle exists between the fifth control signal and the eighth control signal, and the second phase shift angle exists between the sixth control signal and the seventh control signal; and controlling the second phase shift angle to reduce a voltage difference between the third capacitor and the fourth capacitor.

In an embodiment, the controlling the second phase shift angle to reduce a voltage difference between the third capacitor and the fourth capacitor includes:

detecting a third voltage across the third capacitor and a fourth voltage across the fourth capacitor; and determining the second phase shift angle according to a difference between the third voltage and the fourth voltage, reducing the second phase shift angle when the difference is a positive value, and increasing the second phase shift angle when the difference is a negative value.

When the secondary side circuit 2 has an SHB structure, the neutral point balance of the secondary side circuit 2 can also be adjusted in the manner shown in FIG. 4, which is not repeated in this disclosure.

Although the embodiments of the present disclosure are described with an example in which the voltage input source is coupled to the second node and the third node, in other embodiments, the voltage input source may also be coupled to the secondary side circuit 2. In other words, the circuit may run in the forward or reverse direction, or in bidirectional operation, which is not specifically limited in this disclosure.

The above described passive network structure of the DC/DC converter using the three-level circuit and the structure of the secondary side circuit of the transformer are merely examples. The above examples may be combined with each other, and other structures may also be included in other embodiments, as long as the primary side circuit of the transformer is provided with the three-level circuit in SHB structure, the control method provided by the present disclosure can be applied to adjust the voltage of the neutral point.

In summary, according to the embodiments of the present disclosure, it is controlled in such a way that, on two bridge arms of the DC/DC converter in SHB structure, the first switch and the second switch are turned on in a complementary manner, the third switch and the fourth switch are turned on in a complementary manner, causing a phase shift angle between control signals of the first switch and the fourth switch, and adjusting the phase shift angle to reduce a voltage difference between the first capacitor and the second capacitor, thereby effectively adjusting balance of the voltage of the neutral point for the DC/DC converter. Based on this control method, the working modes of the positive and negative half periods are completely symmetrical, the effect on the neutral point is the same, and the on-times of the switches in the SHB structure are the same. Compared to the method implemented by controlling time difference of the level 1 mode to achieve neutral point adjustment, which may cause uneven stress on switches, the method according to the embodiments of the present disclosure has a higher neutral point adjustment capability, which is beneficial for all the four switches in the bridge arm to realize ZVS and, at the same time, causes the stresses and losses of the four switches to be uniform, thereby improving energy efficiency.

It should be noted that although several modules or units of the device for action execution are mentioned in the detailed description above, this division is not mandatory. In fact, according to the embodiments of the present disclosure, the features and functions of two or more modules or units described above may be embodied in one module or unit. Similarly, the features and functions of a module or unit described above can be further divided into multiple modules or units to be embodied.

In addition, the above-mentioned drawings are merely a schematic description of processes included in a method according to an exemplary embodiment of the present invention, and are not limiting purposes. It is easy to understand that the processes shown in the above drawings do not indicate or limit the chronological order of these processes. In addition, it is also easy to understand that these processes may be, for example, performed synchronously or asynchronously in multiple modules.

Other embodiments of the present disclosure will be apparent to those skilled in the art from consideration of the specification and practice of the invention disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the claims.

What is claimed is:

1. A control method of a DC/DC converter, the DC/DC converter comprising a first capacitor and a second capacitor coupled to a first node, a second end of the first capacitor being coupled to a second node, and a second end of the second capacitor being coupled to a third node; a first bridge arm coupled between the first node and the second node and a second bridge arm coupled between the first node and the third node, the first bridge arm comprising a first switch and a second switch coupled to a fourth node, the second bridge arm comprising a third switch and a fourth switch coupled to a fifth node; a transformer having a primary winding electrically connected to the fourth node and the fifth node, and a secondary side circuit electrically connected to a secondary winding of the transformer, wherein the method comprises:

outputting a first control signal, a second control signal, a third control signal, and a fourth control signal to control ends of the first switch, the second switch, the third switch, and the fourth switch, wherein the first control signal, the second control signal, the third control signal, and the fourth control signal are square wave signals having a preset period, the first control signal is complementary to the second control signal, the third control signal is complementary to the fourth control signal, a first phase shift angle exists between the first control signal and the fourth control signal, and the first phase shift angle exists between the second control signal and the third control signal; and controlling the first phase shift angle to reduce a voltage difference between the first capacitor and the second capacitor, wherein the controlling the first phase shift angle to reduce a voltage difference between the first capacitor and the second capacitor comprises:

determining the first phase shift angle according to a difference between a first voltage across the first capacitor and a second voltage across the second capacitor, reducing the first phase shift angle when the difference is a positive value, and increasing the first phase shift angle when the difference is a negative value.

2. The control method according to claim 1, wherein the DC/DC converter further comprises at least one of a first passive network or a second passive network, the first passive network being coupled between the fourth node, the fifth node and the primary winding of the transformer, the second passive network being coupled between the secondary winding of the transformer and the secondary side circuit.

3. The control method according to claim 2, wherein the at least one of the first passive network or the second passive network only include a capacitor.

4. The control method according to claim 2, wherein the at least one of the first passive network or the second passive network comprises a network comprising a capacitor and an inductor connected in series, or in parallel, or in series and in parallel.

5. The control method according to claim 1, wherein the DC/DC converter further comprises:

an input source, coupled to the second node and the third node or coupled to the secondary side circuit.

6. The control method according to claim 1, wherein the secondary side circuit is a full-bridge rectification circuit or a full-wave rectification circuit.

7. The control method according to claim 1, wherein the secondary side circuit comprises a third capacitor and a fourth capacitor coupled to a tenth node, a second end of the third capacitor being coupled to an eleventh node, and a second end of the fourth capacitor being coupled to a twelfth node; a third bridge arm coupled between the eleventh node and the tenth node and a fourth bridge arm coupled between the twelfth node and the tenth node, the third bridge arm comprising a fifth switch and a sixth switch coupled to a thirteenth node, the fourth bridge arm comprising a seventh switch and an eighth switch coupled to a fourteenth node, and the secondary winding being electrically connected to the thirteenth node and the fourteenth node.

8. The control method according to claim 7, further comprising:

outputting a fifth control signal, a sixth control signal, a seventh control signal, and an eighth control signal to control ends of the fifth switch, the sixth switch, the seventh switch and the eighth switch, wherein the fifth control signal, the sixth control signal, the seventh control signal, and the eighth control signal are square wave signals having a preset period, the fifth control signal is complementary to the sixth control signal, the seventh control signal is complementary to the eighth control signal, a second phase shift angle exists between the fifth control signal and the eighth control signal, and the second phase shift angle exists between the sixth control signal and the seventh control signal; and controlling the second phase shift angle to reduce a voltage difference between the third capacitor and the fourth capacitor.

9. The control method according to claim 8, wherein the controlling the second phase shift angle to reduce a voltage difference between the third capacitor and the fourth capacitor comprises:

detecting a third voltage across the third capacitor and a fourth voltage across the fourth capacitor; and determining the second phase shift angle according to a difference between the third voltage and the fourth voltage, reducing the second phase shift angle when the difference is a positive value, and increasing the second phase shift angle when the difference is a negative value.

10. A DC/DC converter, comprising:

a first capacitor, having a first end coupled to a first node and a second end coupled to a second node;

a second capacitor, having a first end coupled to the first node and a second end coupled to a third node;

a first bridge arm, coupled between the first node and the second node, comprising a first switch and a second switch coupled to a fourth node;

a second bridge arm, coupled between the first node and the third node, comprising a third switch and a fourth switch coupled to a fifth node;

a transformer, having a primary winding electrically connected to the fourth node and the fifth node;

a secondary side circuit, electrically connected to a secondary winding of the transformer; and a processor, coupled to the first capacitor, the second capacitor, the first bridge arm, the second bridge arm and the secondary side circuit, and configured to:

output a first control signal, a second control signal, a third control signal, and a fourth control signal to control ends of the first switch, the second switch, the third switch, and the fourth switch, wherein the first control signal, the second control signal, the third control signal, and the fourth control signal are square wave signals having a preset period, the first control signal is complementary to the second control signal, the third control signal is complementary to the fourth control signal, a first phase shift angle exists between the first control signal and the fourth control signal, and the first phase shift angle exists between the second control signal and the third control signal; and control the first phase shift angle to reduce a voltage difference between the first capacitor and the second capacitor, wherein the processor is configured to:

determine the first phase shift angle according to a difference between a first voltage across the first capacitor a second voltage across the second capacitor, reduce the first phase shift angle when the difference is a positive value, and increase the first phase shift angle when the difference is a negative value; and output the first control signal, the second control signal, the third control signal, and the fourth control signal according to the first phase shift angle.

11. The DC/DC converter according to claim 10, further comprising:

at least one of a first passive network or a second passive network, the first passive network being coupled between the fourth node, the fifth node and the primary winding of the transformer, the second passive network being coupled between the secondary winding of the transformer and the secondary side circuit.

12. The DC/DC converter according to claim 11, wherein the at least one of the first passive network or the second passive network only include a capacitor.

13. The DC/DC converter according to claim 11, wherein the at least one of the first passive network or the second passive network comprises a network comprising a capacitor and an inductor connected in series, or in parallel, or in series and in parallel.

14. The DC/DC converter according to claim 10, wherein the DC/DC converter further comprises:

an input source, coupled to the second node and the third node or coupled to the secondary side circuit.

15. The DC/DC converter according to claim 10, wherein the secondary side circuit is a full-bridge rectification circuit or a full-wave rectification circuit.

16. The DC/DC converter according to claim 10, wherein the secondary side circuit comprises a third capacitor and a fourth capacitor coupled to a tenth node, a second end of the third capacitor being coupled to an eleventh node, and a second end of the fourth capacitor being coupled to a twelfth node; a third bridge arm coupled between the eleventh node and the tenth node and a fourth bridge arm coupled between the twelfth node and the tenth node, the third bridge arm comprising a fifth switch and a sixth switch coupled to a thirteenth node, the fourth bridge arm comprising a seventh switch and an eighth switch coupled to a fourteenth node, and the secondary winding being electrically connected to the thirteenth node and the fourteenth node.

17. The DC/DC converter according to claim 16, wherein the processor is further configured to:

output a fifth control signal, a sixth control signal, a seventh control signal, and an eighth control signal are output to control ends of the fifth switch, the sixth switch, the seventh switch and the eighth switch, wherein the fifth control signal, the sixth control signal, the seventh control signal, and the eighth control signal are square wave signals having a preset period, the fifth control signal is complementary to the sixth control signal, the seventh control signal is complementary to the eighth control signal, a second phase shift angle exists between the fifth control signal and the eighth control signal, and the second phase shift angle exists between the sixth control signal and the seventh control signal; and control the second phase shift angle to reduce a voltage difference between the third capacitor and the fourth capacitor.

18. The DC/DC converter according to claim 17, wherein the processor is further configured to:

detect a third voltage across the third capacitor and a fourth voltage across the fourth capacitor; and determine the second phase shift angle according to a difference between the third voltage and the fourth voltage, reduce the second phase shift angle when the difference is a positive value, and increase the second phase shift angle when the difference is a negative value.

* * * * *